US008599434B2

(12) United States Patent
Burry et al.

(10) Patent No.: US 8,599,434 B2
(45) Date of Patent: Dec. 3, 2013

(54) METHOD AND SYSTEM FOR IMPROVED SOLID AREA AND HEAVY SHADOW UNIFORMITY IN PRINTED DOCUMENTS

(75) Inventors: Aaron M. Burry, Ontario, NY (US); Peter Paul, Webster, NY (US); Michael F. Zona, Holley, NY (US)

(73) Assignee: Xerox Corporation, Norwalk, CT (US)

( * ) Notice: Subject to any disclaimer, the term of this patent is extended or adjusted under 35 U.S.C. 154(b) by 1008 days.

(21) Appl. No.: 12/391,888

(22) Filed: Feb. 24, 2009

(65) Prior Publication Data

US 2010/0214580 A1 Aug. 26, 2010

(51) Int. Cl.
*G06F 15/00* (2006.01)
*H04N 1/60* (2006.01)

(52) U.S. Cl.
USPC .......... 358/1.9; 358/3.26; 358/3.27; 358/518; 358/520; 382/275; 399/299

(58) Field of Classification Search
USPC ........... 358/1.9, 3.26, 3.27; 382/275; 399/299
See application file for complete search history.

(56) References Cited

U.S. PATENT DOCUMENTS

| | | | | |
|---|---|---|---|---|
| 4,611,901 | A | 9/1986 | Kohyama | |
| 4,660,059 | A | 4/1987 | O'Brien | |
| 4,833,503 | A | 5/1989 | Snelling | |
| 5,278,589 | A | 1/1994 | Wong | |
| 5,365,074 | A | 11/1994 | Genovese | |
| 5,438,354 | A | 8/1995 | Genovese | |
| 6,760,056 | B2 | 7/2004 | Klassen | |
| 6,904,255 | B2 * | 6/2005 | Kera et al. | 399/299 |
| 6,975,949 | B2 | 12/2005 | Mestha | |
| 7,177,585 | B2 | 2/2007 | Matsuzaka | |
| 2006/0001911 | A1 * | 1/2006 | Viassolo et al. | 358/3.26 |
| 2006/0001921 | A1 * | 1/2006 | Bailey et al. | 358/504 |
| 2006/0077488 | A1 * | 4/2006 | Zhang et al. | 358/504 |
| 2006/0209101 | A1 | 9/2006 | Mizes | |

* cited by examiner

*Primary Examiner* — Steven Kau
*Assistant Examiner* — Quang N Vo
(74) *Attorney, Agent, or Firm* — Pillsbury Winthrop Shaw Pittman, LLP

(57) ABSTRACT

A method for minimizing cross-process non-uniformities in solid and heavy shadow regions of printed documents is provided. The method includes marking with a marking engine an image on an image bearing surface moving in a process direction; generating profile data of the image by sensing an optical characteristic of the image in a cross-process direction; adjusting at least one control actuator of the marking engine so as to shift the characteristic of a subsequent marked image in the cross-process direction to at least a target value; and generating a spatially varying tone reproduction curve to smooth the characteristic of the subsequent marked image towards the target value.

25 Claims, 10 Drawing Sheets

METHOD AND SYSTEM FOR IMPROVED SOLID AREA AND HEAVY SHADOW UNIFORMITY IN PRINTED DOCUMENTS

BACKGROUND

1. Field

The present disclosure relates to a method and a system for minimizing cross-process non-uniformities in solid and heavy shadow regions of printed documents.

2. Description of Related Art

An electrophotographic, or xerographic, image printing system employs an image bearing surface, which is charged to a substantially uniform potential so as to sensitize the surface thereof. The charged portion of the image bearing surface is exposed to a light image of an original document being reproduced. Exposure of the charged image bearing surface selectively dissipates the charge thereon in the irradiated areas to record an electrostatic latent image on the image bearing surface corresponding to the image contained within the original document. The location of the electrical charge forming the latent image is usually optically controlled. More specifically, in a digital xerographic system, the formation of the latent image is controlled by a raster output scanning device, usually a laser or LED source.

After the electrostatic latent image is recorded on the image bearing surface, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image, forming a visible powder image on the image bearing surface. After the electrostatic latent image is developed with the toner particles, the toner powder image is transferred to a media, such as sheets, paper or other substrate sheets, using pressure and heat to fuse the toner image to the media to form a print.

The image printing system generally has two important dimensions: a process (or a slow scan) direction and a cross-process (or a fast scan) direction. The direction in which an image bearing surface moves is referred to as the process (or tie slow scan) direction, and the direction perpendicular to the process (or the slow scan) direction is referred to as the cross-process (or the fast scan) direction.

Electrophotographic image printing systems of this type may produce color prints using a plurality of stations. Each station has a charging device for charging the image bearing surface, an exposing device for selectively illuminating the charged portions of the image bearings surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a media. The transferred multicolor image is then permanently fused to the media forming the color print.

Improving uniformity in images is desirable for high quality rendering. An array sensor (e.g., a Full Width Array (FWA)) enables scanning the developed images to measure a wide variety of image defects that might occur in the xerographic process. The array sensor may be used to detect both non-uniformities in the cross-process direction and process direction (i.e., streaks and bands, respectively).

"Streaks" as used herein are uniformity variations in the cross-process direction, at all spatial frequencies (i.e., "narrow" streaks as well as "wide" streaks including variations along the lateral side of the image printing system), and at all area coverage levels. Streaks are a major image quality defect for both image-on-image (IOI) and Intermediate Belt Transfer (IBT) Tandem xerography. Streaks are primarily one-dimensional visible defects in the image that run parallel to the process direction (i.e., the slow-scan direction). In a uniform gray level patch, streaks may appear as a variation in reflectance. As used herein, "gray" refers to the area coverage value of any single color separation layer, whether the toner is black, cyan, magenta, yellow, or some other color. In a color xerographic machine, streaks in single color separations that may be unobjectionable alone can cause an undesirable visible color shift for overlaid colors.

Image printing technologies may contain several sources of streaks, which can sometimes be difficult to control via image printing system design or image printing system optimization. Streaks may be caused by "non-ideal" responses of xerographic components in the marking engine of the image printing system. The source of these artifacts may be found in contamination of the development wires, photoreceptor (P/R) non-uniformities, fuser non-uniformities, charge device contamination, etc. Streaks may also be caused by non-uniformity of the raster output scanning device spot-size or intensity variations.

As shown in FIG. 1, a measured reflectance profile of a single color, uniform test image generated by the image printing system is shown. The reflectance profile is generated by measuring the reflectivity of the image in the cross-process direction. The measured reflectance profile illustrates streaks as undesired variations in cross-process reflectance in the test image. It is well known by practitioners of the art that a relationship exists between luminance, as described, for example, by CIELAB L*, and reflectance. Thus if a printed page of the test target whose reflectance is depicted in FIG. 1 were measured for its L* profile, it would look similar to FIG. 1 with a change of scale. A desired reflectance profile for such a test image would be flat. Similarly, a desired L* profile for the test image would also be flat.

Non-uniformities in the cross-process direction (e.g., streaks) in halftones and solid regions may be very problematic to mitigate using spatial exposure modifications since many Raster Output Scanner (ROS) devices only support modulations in the cross-process direction at low spatial frequency. In other words, the ROS devices do not have the capability to adjust intensity fast enough to compensate at medium to high frequency (i.e., very low frequency intensity adjustment is achievable). This makes compensating higher spatial frequency non-uniformities in the cross-process direction, such as charge device non-uniformities, extremely difficult, using the exposure intensity actuator. Also, many ROS devices also do not support adjusting intensity on a pixel-by-pixel basis in the cross-process (i.e., fast-scan) direction. This makes compensating for higher spatial frequency cross-process non-uniformity through spatial exposure modulation using such devices nearly impossible.

Image Based Control (IBC) techniques enable compensation of streaks by sensing: the uniformity across the process of the image printing system and spatially actuating either the exposure or a Spatially Varying Tone Reproduction Curve (STRC).

For example, U.S. Pat. No. 6,760,056; U.S. Patent Application Publication No. 2006/0209101; and U.S. Patent Ser. No. 61/056,754 filed on May 28, 2008 describe a streak correction system that uses an in situ monochrome sensing full width array sensor to sense streak non-uniformities and uses spatially varying Tone Reproduction Curves (TRC) as actuators to correct for the streak non-uniformities. The streak correction system described in the above-mentioned references utilizes image-based correction to compensate for streak non-uniformities. However, the streak correction system described in the above mentioned references cannot correct streaks occurring in solid regions (i.e. because every pixel in the digital image is already "on" for a solid region).

U.S. Patent Application Publication No. 2006/0001911 describes another streak correction system that uses an offline scanner to determine the streak non-uniformities and uses cross process, or fast scan direction, adjustment of the ROS exposure to correct for the non-uniformities. Smile correction is a well known technique used in polygon ROS systems to correct for aerial image illumination non-uniformity across the scan line. It is accomplished by "calibrating" the ROS by measuring the illumination level at several points (for example, 20) along the ROS scan line. Smile correction is a standard technique for correcting low spatial frequency non-uniformity in the fast scan direction using the ROS as the actuator. Many types of ROS devices do not allow for pixel-by-pixel adjustment of the exposure intensity. Thus, there are substantial limitations to the spatial frequencies for which these ROS devices alone can be used to compensate print non-uniformities in the cross-process direction. In addition, depending on the xerographic setup with respect to the slope of the photo-induced discharge characteristic (PIDC) curve, the ROS may not have much actuator authority in the solid and shadow regions.

U.S. patent Ser. No. 12/112,618 filed on Apr. 30, 2008 describes the combination of ROS actuation and spatially varying TRC actuation for streaks compensation. However, the exposure actuation is used for low spatial frequency non-uniformities (which often have a larger amplitude) and the spatially varying TRC actuator is used for high spatial frequency non-uniformities (which usually have a smaller amplitude). The streak correction scheme described in this reference does not propose any special processing to compensate for streaks in solid and heavy shadow regions.

Therefore, the streak compensation techniques described above have opportunities for improvement. As noted above, the spatial actuation of the exposure often has limitations in spatial bandwidth (i.e., it is good for low spatial frequencies only—"smile" correction) and may have limited actuator authority in the heavy shadow and solid regions due to xerographic setup on a more saturated portion of a photo-induced discharge characteristic (PIDC) curve. Spatial TRC actuation exhibits wide spatial bandwidth, however it has limited actuator authority in the heavy shadow regions and only unidirectional authority at the solid. This type of correction, using the digital image and spatial TRCs as actuators, cannot adequately correct streaks that occur in solid and heavy shadow regions. In other words, by using only the digital image as the actuator, it is impossible to make the digital image to be "darker" than every pixel on.

Also, bandwidth limitations on many current exposure technologies do not allow modification of the exposure intensity in the cross-process direction at sufficiently high spatial frequencies to correct for many streak artifacts.

Further, the image based control streak correction methods discussed in above references can only make a solid "lighter" rather than making it "darker". Therefore, either the solid is lightened to achieve uniformity at the cost of a greatly reduced gamut (i.e., solid regions are brought to a uniform lightened state), or the solid regions are not made uniform (i.e., but the gamut is not intentionally affected). Gamut, in color reproduction, refers to a subset of colors that can be accurately represented in a given circumstance. The color gamut could still be affected by the defect. In other words, if there are streaks the macroscopic effect could be a substantially lighter output, i.e., reduced gamut. The inventors in the present disclosure propose maintaining (and in most cases increasing) the gamut (i.e., by maintaining the "darkness" of the solid regions, while also improving solid area uniformity).

Thus, the present disclosure provides improvements in streak compensation techniques that address the streaks in solids and shadow regions at both the high spatial frequency and low spatial frequency content, while maintaining the accessible color gamut of the print process across the full inboard-to-outboard process width of the printing system.

SUMMARY

According to one aspect of the present disclosure, a method for minimizing cross-process non-uniformities in solid and heavy shadow regions of printed documents is provided. The method includes marking with a marking engine an image on an image bearing surface moving in a process direction; generating profile data of the image by sensing an optical characteristic of the image in a cross-process direction; adjusting at least one control actuator of the marking engine so as to shift the characteristic of a subsequent marked image in the cross-process direction to at least a target value; and generating a spatially varying tone reproduction curve to smooth the characteristic of the subsequent marked image towards the target reflectance value.

The contone image for a solid is uniform. With the spatially varying TRC, when the original contone image asks for a solid, the image is "warped" using the spatially varying TRC to produce an alternate image that, when printed using the non-uniform print process so as to achieve a uniform output printed page. An Engine Response Model (ERM) is the response of the engine to different input contone values or halftone area coverages.

According to another aspect of the present disclosure, a, system for minimizing cross-process non-uniformities in solid regions of printed documents is provided. The system includes a marking engine, a processor, and a controller. The marking engine is configured to mark an image on an image bearing surface moving in a process direction. The processor is configured to generate profile data of the image by sensing an optical characteristic of the image in a cross-process direction. The controller is configured to adjust at least one control actuator of the marking engine so as to shift a the characteristic of a subsequent marked image in the cross-process direction to at least a target value. The processor is configured to generate a spatially varying tone reproduction curve to smooth the characteristic of the subsequent marked image towards the target value.

The sensed optical characteristic may be one of light reflected from the image bearing surface or light transmitted through the image bearing surface.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure addresses an issue in the area of uniformity correction, namely, the cross-process uniformities (i.e., streaks) in solids/shadow regions. The present disclosure proposes the use of a higher spatial frequency actuator (i.e., the image based control) in combination with the lower spatial frequency actuators (i.e., the xerographic actuators) to solve this issue (e.g., to improve cross-process uniformities (i.e., streaks) in solid regions including the shadow regions).

The present disclosure proposes a two-step solution. In the first step, the darkest cross-process area of the solid test patch or image is calculated from the uniformity profile, and the xerographic actuators are adjusted until the entire image is shifted so that the lightest cross-process area in the solid region becomes the darkest level measured in the original uniformity profile. In the second step, the contone (i.e., continuous tone) values of the digital image are adjusted on a pixel-by-pixel basis to level out the entire image, thus overcoming cross-process uniformities (i.e., streaks). Thus, the xerographic actuators and the digital image actuators both work in a coordinated way to achieve uniformity compensation for all area coverage levels, including at the solids and heavy shadow regions.

In the context of the present disclosure, the term "halftoned image" refers to a representation of a two-dimensional data structure composed of pixels, where a given pixel in the image is either "ON" or "OFF". Pixels are defined to be ON if they are black and OFF if they are white (i.e., the designation of black as ON and white as OFF reflects the fact that most documents of interest have a black foreground and a white background).

The term "contone image," by contrast, refers to a two-dimensional data structure composed of pixels, wherein each pixel has an integer value depending on the number of bits used to represent the image. For example, for 8 bit image data, pixel values may be between 0 and 255, and for 10 bit image data, pixel values may range be 0 and 1023.

A "solid region" of an image refers to a region extending many pixels in both dimensions within which substantially all the pixels are "ON". A "textured region" of an image refers to a region that contains a relatively fine-grained pattern. Examples of textured regions are halftone regions.

Figure 1:
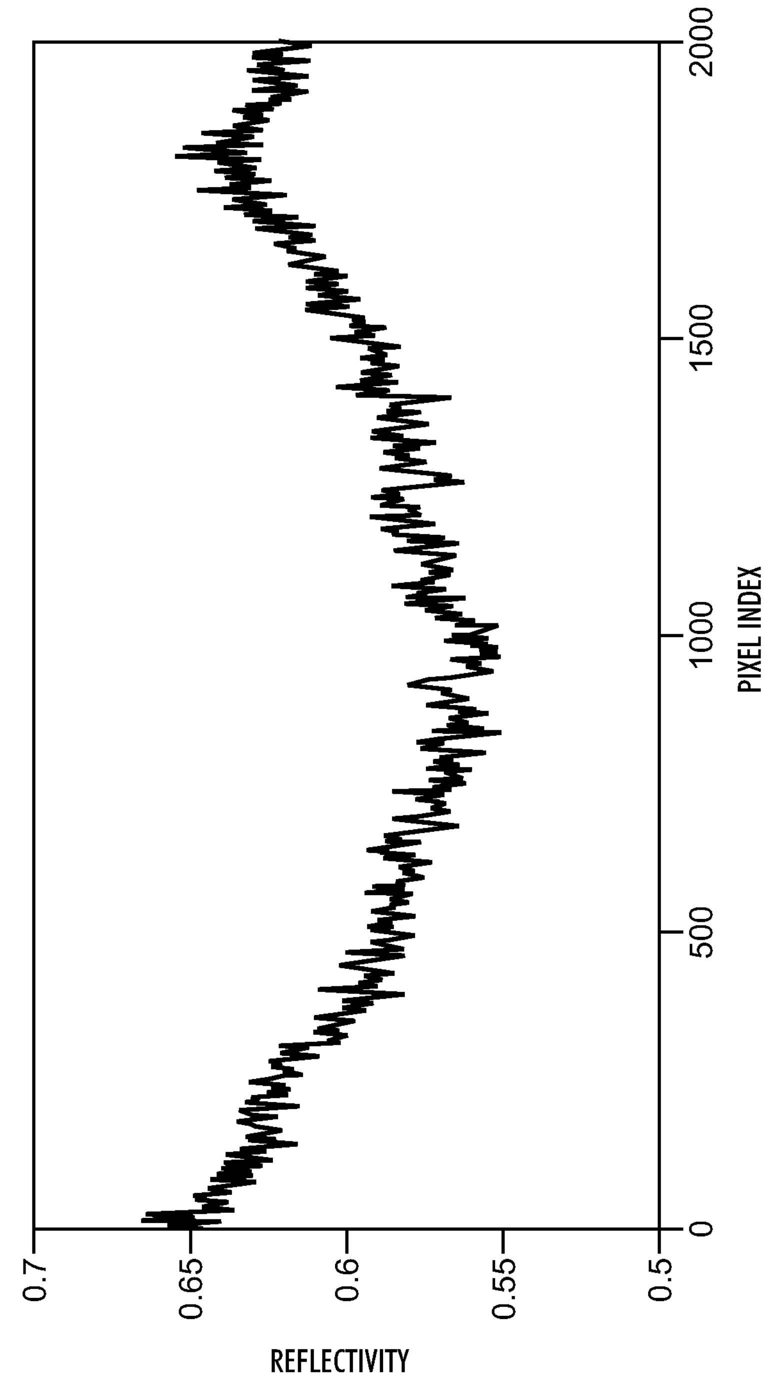
FIG. 1 illustrates an exemplary measured reflectance profile in a cross-process direction for a single color, uniform test pattern.
Figure 2:
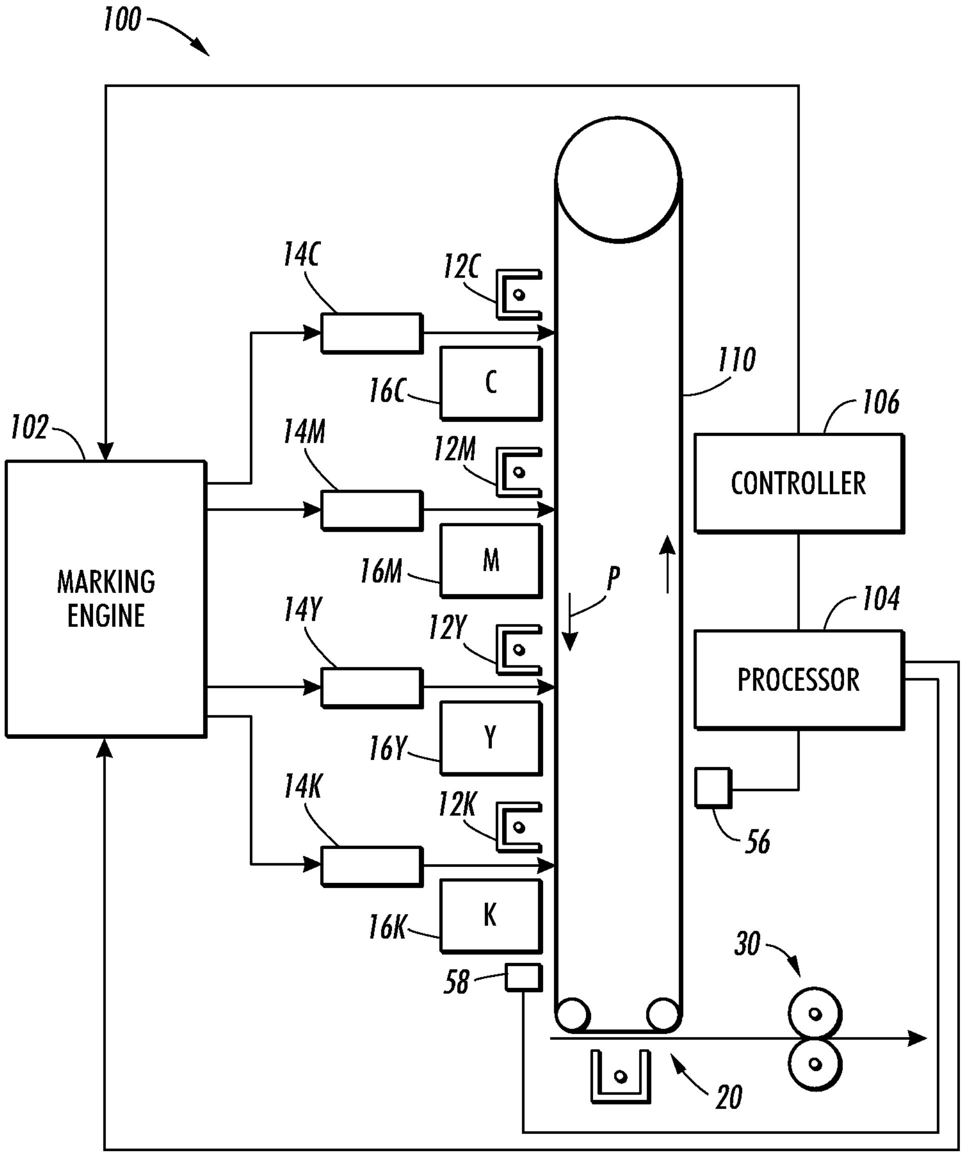
FIG. 2 illustrates an image printing system incorporating a system for minimizing cross-process non-uniformities in solid regions of printed documents in accordance with an embodiment of the present disclosure.

FIG. 2 shows a partial, simplified, schematic perspective view of an image printing system having a system 100 for minimizing cross-process non-uniformities at all area coverage levels including solid and heavy shadow regions of printed documents. Specifically, there is shown an "image-on-image" xerographic color image printing system, in which successive primary-color images are accumulated on an image bearing surface (e.g., a photoreceptor belt) 110, and the accumulated superimposed images are in one step directly transferred to an output document as a full-color image. This particular type of printing is also referred as "single pass" multiple exposure color printing. In one implementation, the Xerox Corporation iGen3® digital printing press may be utilized. However, it is appreciated that any image printing machine, such as monochrome machines using any technology, machines that print on photosensitive substrates, xerographic machines with multiple photoreceptors, or ink-jet-based machines, may utilize the present disclosure as well. The system may also be used in analog and digital copiers, scanners, facsimiles, or multifunction machines.

The image printing system typically uses a Raster Output Scanner (ROS) to expose the charged portions of the image bearing surface 110 to record an electrostatic latent image on the image bearing surface 110. Further examples and details of such image on image printing systems are described in U.S. Pat. Nos. 4,660,059; 4,833,503; and 4,611,901, each of which are incorporated herein by reference. U.S. Pat. No. 5,438,354, the entirety of which is incorporated herein by reference, provides a Raster Output Scanner (ROS) system.

However, it will be appreciated that the present disclosure could also be employed in non-xerographic color printing systems, such as ink jet printing systems, or in "tandem" xerographic or other color printing systems, typically having plural print engines transferring respective colors sequentially to an intermediate image transfer belt and then to the final substrate. Thus, for a tandem color printer (e.g., U.S. Pat. Nos. 5,278,589; 5,365,074; 6,904,255 and 7,177,585, each of which are incorporated herein by reference) it will be appreciated that the image bearing surface may be either or both on the photoreceptors and the intermediate transfer belt, and have linear array sensors and image position correction systems appropriately associated therewith. Various such known types of color image printing systems are further described in the above-cited patents and need not be further discussed herein.

In one embodiment, the image bearing surface 110 is at least one of a photoreceptor drum, a photoreceptor belt, an intermediate transfer belt, an intermediate transfer drum, and other image bearing surfaces. That is, the term image bearing surface 110 means any surface on which an image is received, and this may be an intermediate surface (i.e., a drum or belt on which an image is formed prior to transfer to a printed document).

The system 100 for minimizing cross-process non-uniformities in solid regions of printed documents includes a marking engine 102, a processor 104, and a controller 106. The marking engine 102 is configured to mark an image on the image bearing surface 110 moving in a process direction. The processor 104 is configured to generate a reflectance profile data of the image by sensing reflectance of the image in a cross-process direction. The controller 106 is configured to adjust at least one control actuator of the marking engine 102 so as to shift a reflectance of a subsequent marked image in the cross-process direction to at least a target reflectance value. The processor 104 is configured to generate a spatially varying tone reproduction curve to smooth the reflectance of the subsequent marked image towards the target reflectance value. In some implementations, the processor 104 may be in direct communication with the marking engine 102.

While reference to sensing a reflectance characteristic is disclosed herein, it will be appreciated that other optical characteristics may also be sensed and used in conjunction with the disclosed embodiments. For example, in one embodiment, a transmissive sensor may be used for measuring the density of a colorant on the image bearing surface. Rather than applying a light source onto a substrate and measuring the light that is reflected to the sensor, the transmissive sensor would receive light applied from a light source on the other side of the image bearing surface. Light would then pass through the substrate, through the colorant, and finally on to the sensor. The amount of light that reaches the sensor would by effected by the density of the colorant. Of course, this requires an image bearing surface that is amenable to transmission mode. The sensed transmission data would be used in the same basic fashion with the rest of the compensation approach using reflectance data. Indeed, the methodology disclosed herein is essentially the same, independent of the sensing mode.

The marking engine 102 is configured to mark an image on the image bearing surface 110 moving in a process direction. In one embodiment, the image marked with the marking engine 102 on the image bearing surface 110 is a toner image. A series of stations are disposed along the image bearing surface 110, as is generally familiar in the art of xerography, where one set of stations is used for each primary color to be printed.

In one embodiment, the image may be applied on the image bearing surface 110 by one or more lasers such as 14C, 14M, 14Y, and 14K. As would be appreciated by one skilled in the art by coordinating the modulation of the various lasers such as 14C, 14M, 14Y, and 14K with tie motion of the image bearing surface 110 and other hardware (such as rotating mirrors, etc., not shown), the lasers discharge areas on the image bearing surface 110 to create the desired test targets, particularly after these areas are developed by their respective development units 16C, 16M, 16Y, 16K.

For example, to place a cyan color separation image on the image bearing surface 110, there is used a charge corotron 12C, an imaging laser 14C, and a development unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of the image bearing surface 110, and then the image is transferred from the image bearing surface 110 (e.g., at transfer station 20) to the document to form a printed image on the document. The output document is then run through a fuser 30, as is familiar in xerography.

The system 100 includes sensors 56 and 58 that are configured to provide feedback (e.g., reflectance of the image in the cross-process direction) to the processor 104. The sensors 56 and 58 are configured to scan images created on the image bearing surface 110 and/or to scan test patterns. In an embodiment, the sensors 56 and 58 may be placed just before or just after the transfer station 20 where the toner is transferred to the document. It should be appreciated that any number of sensors may be provided, and may be placed anywhere in the image printing system as needed, not just in the locations illustrated.

The reflectance of the image in the cross-process direction is sensed using an array sensor, for example sensor 56 and 58. In one embodiment, the reflectance uniformity profile of the solid image is measured by the sensor array under nominal xerographic actuator settings.

Preferably, the array sensor is, for example, a full width array (FWA) sensor. A full width array sensor is defined as a sensor that extends substantially an entire width (e.g., perpendicular to a direction of motion) of the moving image bearing surface. In one embodiment, the linear array sensor is extending in the cross-process direction and is adjacent the image bearing surface. In one embodiment, the full width array sensor is configured to detect any desired part of the printed image, while printing real images. The full width array sensor may include a plurality of sensors equally spaced at intervals (e.g., every 1/600th inch (600 spots per inch)) in the cross-process (or a fast scan) direction. See for example, U.S. Pat. No. 6,975,949, incorporated herein by reference. It is understood that other linear array sensors may also be used, such as contact image sensors, CMOS array sensors or CCD array sensors. Although the full width array sensor or contact sensor is shown in the illustrated embodiment, it is contemplated that the present disclosure may use sensor chips that are significantly smaller than the width of the image bearing surface, through the use of reductive optics. In one embodiment, the sensor chips may be in the form of an array that is one or two inches long and that manages to detect the entire area across the image bearing surface through reductive optics. In one embodiment, a processor may be provided to both calibrate the linear array sensor and to process the reflectance data detected by the linear array sensor. It could be dedicated hardware like ASICs or FPGAs, software, or a combination of dedicated hardware and software.

Figure 4A:
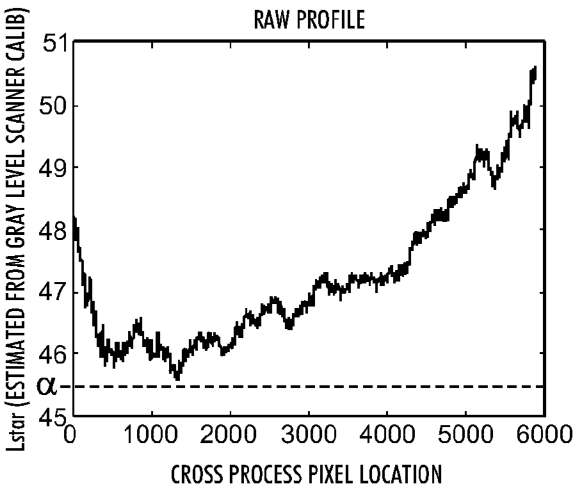
FIG. 4A illustrates an exemplary luminance profile data in a cross-process direction of a solid image under nominal xerographic actuator settings in accordance with an embodiment of the present disclosure.

As noted above, the processor 104 receives the reflectance of the image in the cross-process direction sensed by the linear array sensor. The processor 104 generates a reflectance profile data which is related to a corresponding luminance profile data (as shown in FIG. 4A) of the image using the reflectance of the image in the cross-process direction sensed by the linear array sensor. FIG. 4A shows an exemplary luminance profile data, which is related to corresponding reflectance profile, in the cross-process direction of a solid image under nominal xerographic actuator settings in accordance with an embodiment of the present disclosure.

The controller 106 is configured to adjust at least one control actuator of the marking engine so as to shift a reflectance of a subsequent marked image in the cross-process direction to at least a target reflectance value. The at least one control actuator of the marking engine 102 that is adjusted by the controller 106 is selected from the group consisting of development field and cleaning field. These actuators may be determined through any number of other adjustments within the set of xerographic actuators. For instance, controller 106 may adjust the development field by changing the ROS power, the developer bias, the DC bias on the charge device, or the like.

The target reflectance value is represented by α in FIG. 4A. In one embodiment, the target reflectance value α includes a darkest region in the cross-process direction of the image. In such embodiment, the target reflectance value α is determined from the reflectance profile data. In another embodiment, the target reflectance value α is a pre-determined reflectance value. In such embodiment, for example, the target reflectance value α may be equal to 0.1 or 10% reflectance value; that is, when the target reflectance value α is measured on a reflectance scale where 1 represents 100% reflectance and 0% represents zero reflectance.

The target reflectance value a may be chosen to be any level, preferably darker than the lightest level in the original reflectance profile data. For example, the target reflectance value α may be chosen to match a pre-specified "darkness" level, or may be specified to match the "darkness" of a set of engines for engine-to-engine color matching. Preferably, but not necessarily, the target reflectance value α is not chosen so low as to cause contouring in the shadow regions. For example, the target reflectance value α may be luminance space or in reflectance space.

Figure 4B:
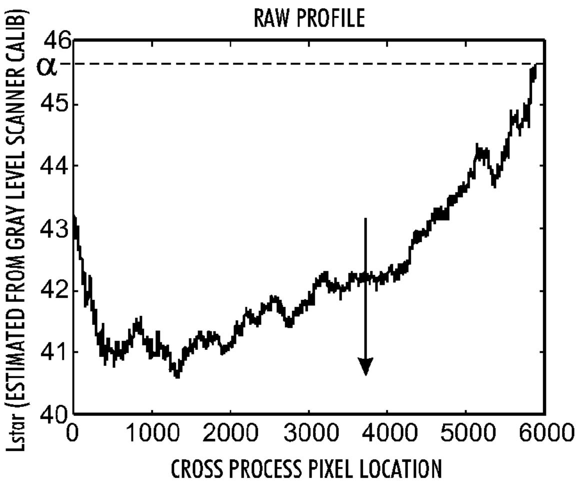
FIG. 4B illustrates an exemplary luminance profile data in which the reflectance of a subsequent marked image in the cross-process direction is shifted to at least a target reflectance value by adjusting at least one control actuator of the marking engine in accordance with an embodiment of the present disclosure.

In one embodiment, as shown in FIG. 4B, by using any number of the xerographic or the control actuators (e.g., DC voltage applied to the charge device, developer bias, and ROS intensity), the entire image is shifted so that the lightest cross-process area in the solid image achieves the same reflectance as the darkest level (i.e., the target reflectance value α) measured in the reflectance profile data, or corresponding luminance profile data shown in FIG. 4A. The xerographic or control actuators may include $V_{high}$ (i.e., charge level of the image bearing surface without the exposure), $V_{dev}$ (i.e., development bias that lies between $V_{high}$ and $V_{expose}$), or $V_{expose}$ (i.e., the charge level of the areas on the image bearing surface that are selectively exposed to ROS).

The processor 104 is also configured to generate a spatially varying tone reproduction curve to smooth the reflectance of the subsequent marked image towards the target reflectance value as will be clear from the discussions below. This TRC may be considered an actuator. It is based on the measured/calibrated Engine Response Model (ERM) that indicates how the engine responds (i.e., the output reflectance or luminance L*) to different halftone area coverage (or contone gray value) inputs.

Figure 3:
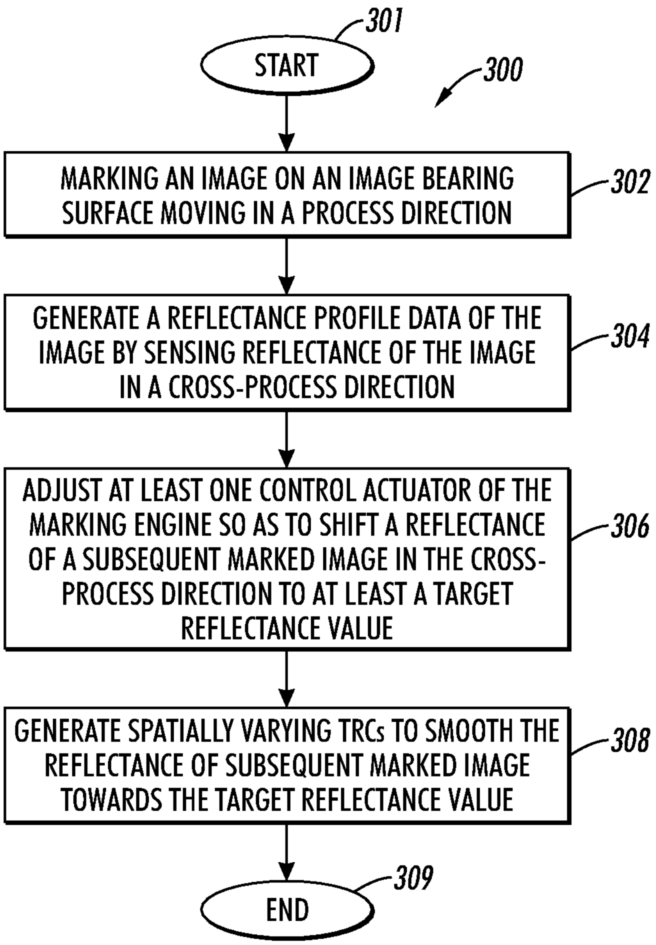
FIG. 3 illustrates a method for minimizing cross-process non-uniformities in solid regions of printed documents in accordance with an embodiment of the present disclosure.

In FIG. 3, a method 300 for minimizing cross-process non-uniformities in solid regions of printed documents is provided. The method 300 uses a combination of the xerographic actuators and the digital image as the main actuators for eliminating cross-process non-uniformities. Using this method, the entire image is lightened or darkened using an appropriate xerographic actuator. The digital image is then adjusted (e.g., on a pixel-by-pixel basis) to compensate for the non-uniformities that were measured by the linear array sensor.

The method 300 begins at procedure 301 and proceeds to procedure 302, where an image is marked with the marking engine 102 on the image bearing surface 110 moving in a process direction. The image may be a 100% density patch that spans across the lateral ends in the cross-process direction of the image printing system. The method 300 then proceeds to procedure 304 in which a reflectance profile data of the image is generated by sensing reflectance of the image in a cross-process direction. In one embodiment, as noted above, the reflectance profile data of the image is measured by the linear sensor array (e.g., a full width array sensor) under nominal xerographic actuator settings.

The method 300 proceeds to procedure 306 in which at least one control actuator of the marking engine 102 is adjusted so as to shift a reflectance of a subsequent marked image in the cross-process direction to at least a target reflectance (i.e., darkness) value. The at least one control actuator of the marking engine 102 that is adjusted is selected from the group consisting of $V_{high}$ (i.e., charge level of the image bearing surface without the exposure), $V_{dev}$ (i.e., development bias that lies between $V_{high}$ and $V_{expose}$), or $V_{expose}$ (i.e., the charge level of the areas on the image bearing surface that are selectively exposed to ROS).

Figure 4C:
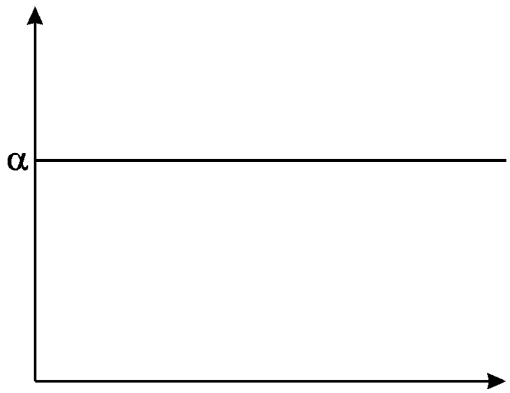
FIG. 4C illustrates an exemplary luminance profile data in which image based control (i.e., locally adjusting the digital gray level of the image to achieve a desired target response in the print) is used to achieve uniform luminance profile in accordance with an embodiment of the present disclosure.

The method 300 then proceeds to procedure 308 in which a spatially varying tone reproduction curve is adjusted or generated to smooth the reflectance of the subsequent marked image towards the target reflectance value. That is, the digital image is adjusted accordingly, through Spatially Varying TRCs, to level out the entire image to the target reflectance value (i.e., α in the FIG. 4A). FIG. 4C illustrates an exemplary reflectance profile data in winch the uniform reflectance profile is achieved using the image based control in accordance with an embodiment of the present disclosure.

Therefore, by characterizing the reflectance movement as a function of various xerographic or control actuators of the marking engine and the sensitivity of the reflectance to the halftone area coverage on a pixel-by-pixel basis, the digital image may be adjusted on a pixel-by-pixel basis to achieve the desired cross-process uniformity.

In an alternate embodiment, the procedure in which the entire image is shifted darker (i.e., using xerographic or control actuators of the marking engine) is performed using a feedback loop, rather than through a characterization function. A feedback loop may require a few iterations to converge to the proper "darkness", but may not require a priori or in situ characterization. The best approach for a given implementation depends on the specific requirements of the application.

The graphs shown in FIGS. 4A-4C illustrate reflectivity in L* units on a vertical y-axis. Also, depending on the sensor and sensing substrate used, the profile may be in reflectance units, density units, or L* units. On a horizontal x-axis, the graphs shown in FIGS. 4A-4C illustrate cross-process pixel location. The cross-process pixel location may also referred be to as pixel index.

Figure 5:
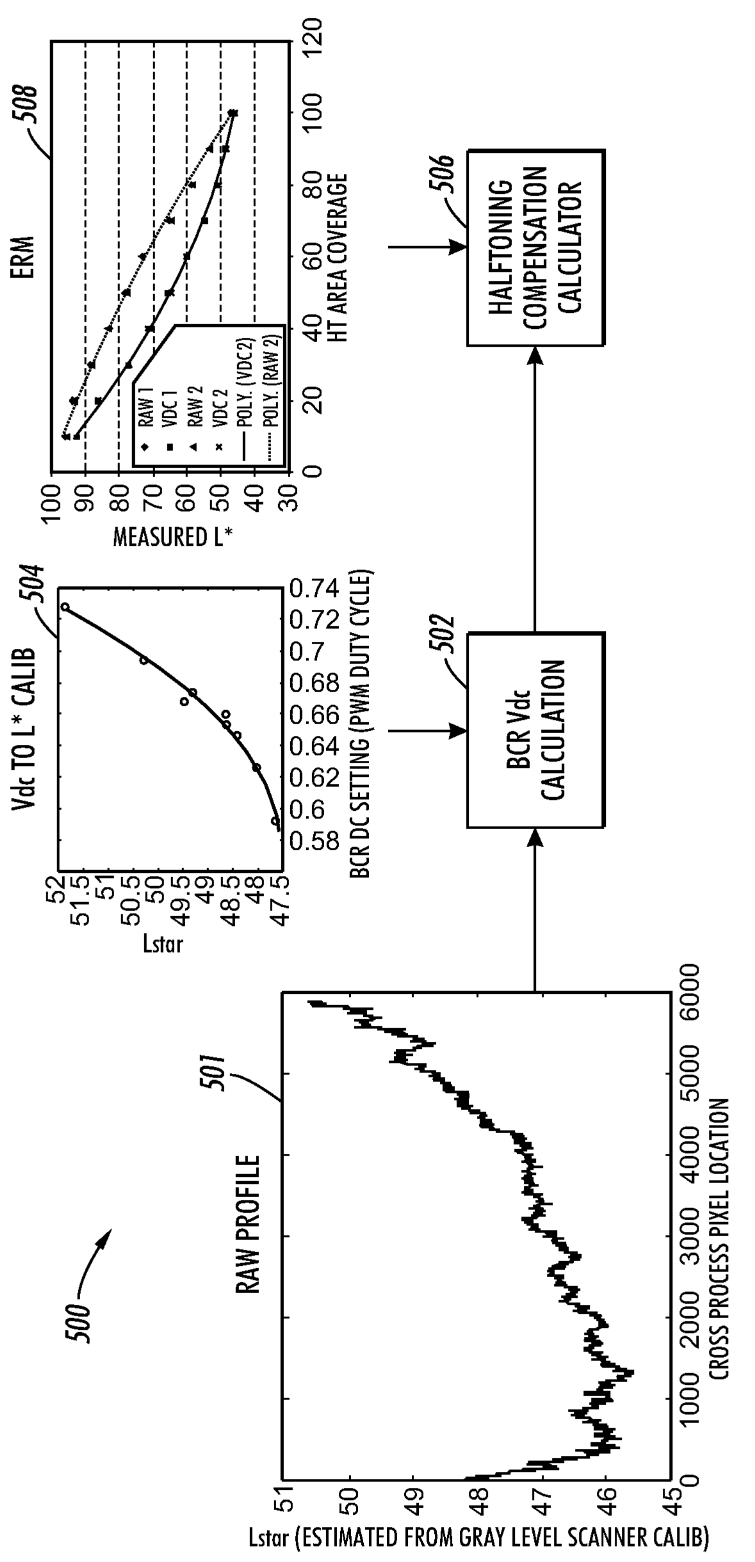
FIG. 5 illustrates an exemplary system for eliminating cross-process non-uniformities in which a combination of xerographic actuators and image based control are used as the main actuators in accordance with an embodiment of the present disclosure.

FIG. 5 illustrates an exemplary system 500 for eliminating cross-process non-uniformities in which a combination of xerographic or control actuators and image based control are used as the main actuators in accordance with an embodiment of the present disclosure. In the illustrated embodiment shown in FIG. 5, the at least one control or xerographic actuator of the marking engine 102 (shown in FIG. 2) may be a DC voltage level of charge. For example, the Charger Voltage (i.e., specifically the biased charger roll, BCR DC bias) is used as the xerographic or the control actuator.

In the exemplary system 500, an offline scanner is used to mimic the in situ linear array sensor (i.e., full width array sensor). A reflectance profile data or a L* profile 501 of a solid image is obtained under nominal xerographic actuator conditions. This reflectance profile data 501 shows non-uniformity in the cross-process direction of the solid to be roughly four L* units with a standard deviation of one unit. The raw profile 501 illustrates reflectivity in L* units on a vertical y-axis and the cross-process pixel location on a horizontal x-axis.

The entire image is then adjusted darker using the Charge Voltage as the control actuator. Specifically, the DC portion of the waveform that is applied to the charging device is actuated. By lowering the charger DC offset, the development field is increased to provide higher development, thereby making the entire print darker, including every cross-process location pixel of the solid image.

Figure 6:
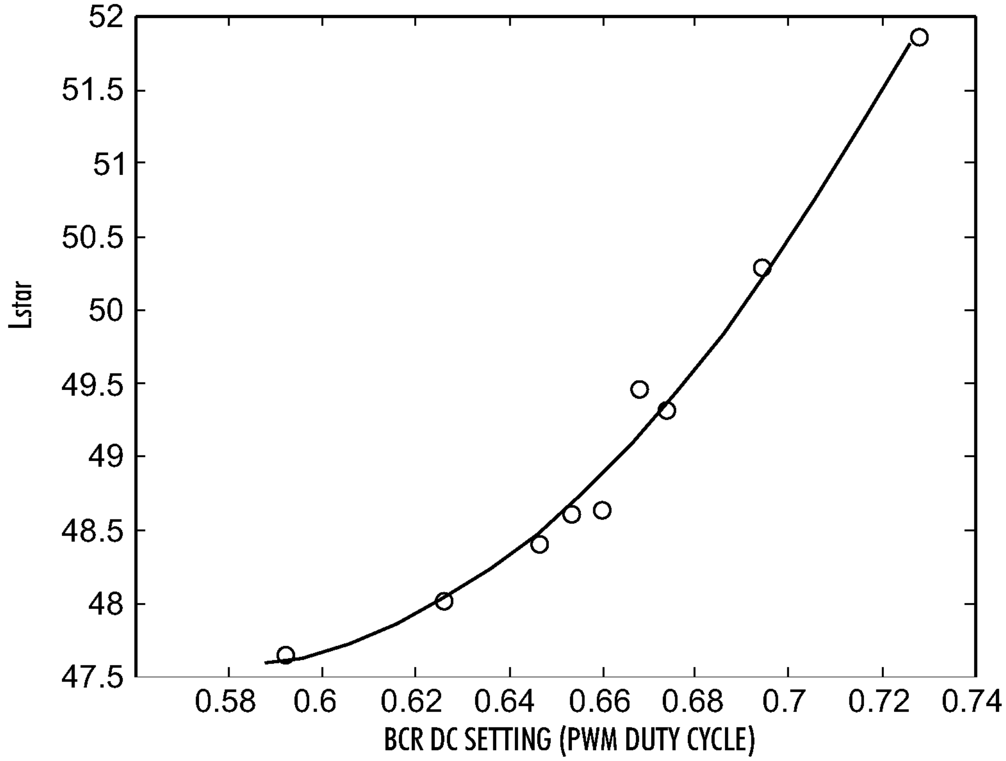
FIG. 6 illustrates a calibration curve for a biased charging roll actuator that is used as a xerographic actuator in accordance with an embodiment of the present disclosure.

A biased charger roll calculation subsystem 502 uses a biased charger roll calibration curve 504 (as shown in FIG. 6) to adjust the entire image darker. As clearly shown in FIG. 6, the biased charger roll calibration curve 504 provides a response of darkness level on the paper (i.e., output L*) to biased charger roll actuator. In other words, the biased charger roll calibration curve 504 provides the effect of the biased charger roll DC setting effect on the solid image L*. The biased charger roll calibration curve 504 illustrates reflectivity in L* units on a vertical y-axis and the biased charger roll DC setting (i.e., pulse width modulation duty cycle) on a horizontal x-axis.

The digital image is later modified to smooth out the entire cross-process non-uniformity. Since this is a solid, the original halftoned digital image includes all pixels turned on. The modified image (i.e., the image after image based control adjustment) includes some pixels turned off so as to equalize the uniformity along the cross-process direction. This image was scanned offline to characterize L* across the page, resulting in reducing the non-uniformity by half, to roughly 2 L* units with a standard deviation of 0.5 units.

Figure 8:
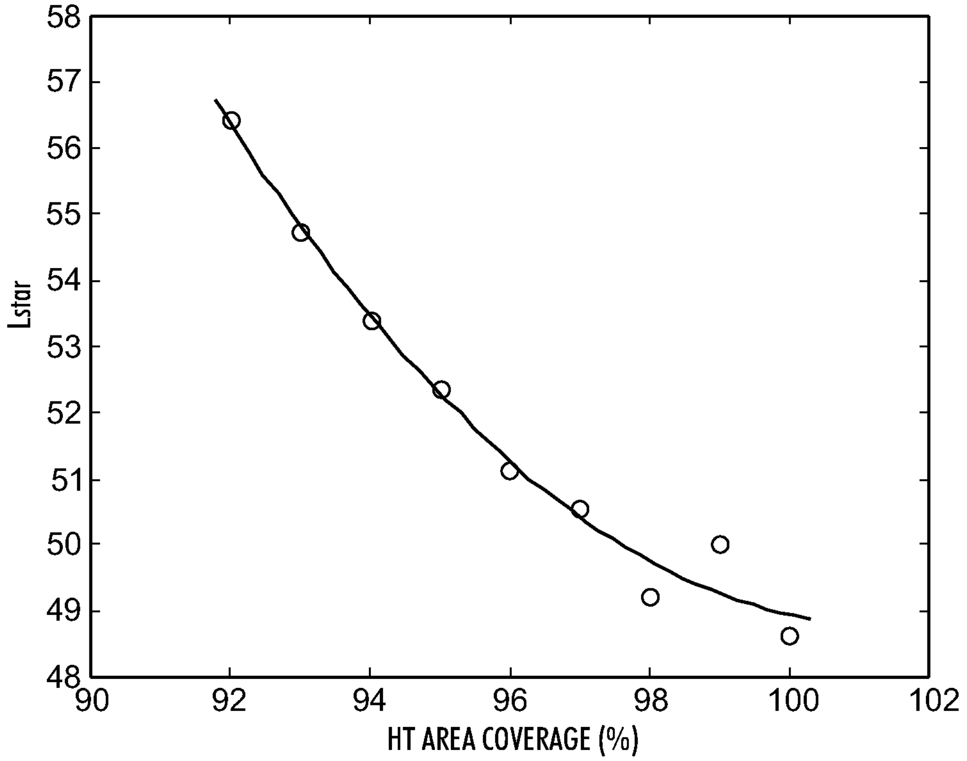
FIG. 8 illustrates a nominal Engine Response Model (ERM). Based on this model, the spatially varying TRC is used as a spatial actuator to make the image uniform in accordance with an embodiment of the present disclosure; The ERM defines the engine response to different input halftone (or contone) levels. The TRC is the actuator mapping that is generated based on this ERM to achieve the desired goal (i.e., a uniform image).

FIG. 8 shows a nominal Engine Response Model (ERM) curve. The nominal ERM curve provides the response of darkness level on the paper (i.e., output L*) to halftone density of the image. This response is then used to generate a spatially varying TRC at each pixel location across the print process. The TRC is the spatial actuator that may be used to make the image uniform. However, as the ERM curve indicates, the actuator saturates at 100% area coverage (i.e. the image cannot be made any darker than asking for all the pixels to be on using the image actuator). The nominal ERM curve illustrates luminance in L* units on a vertical y-axis and the halftone area coverage, expressed as a percentage, on a horizontal x-axis.

Figure 9:
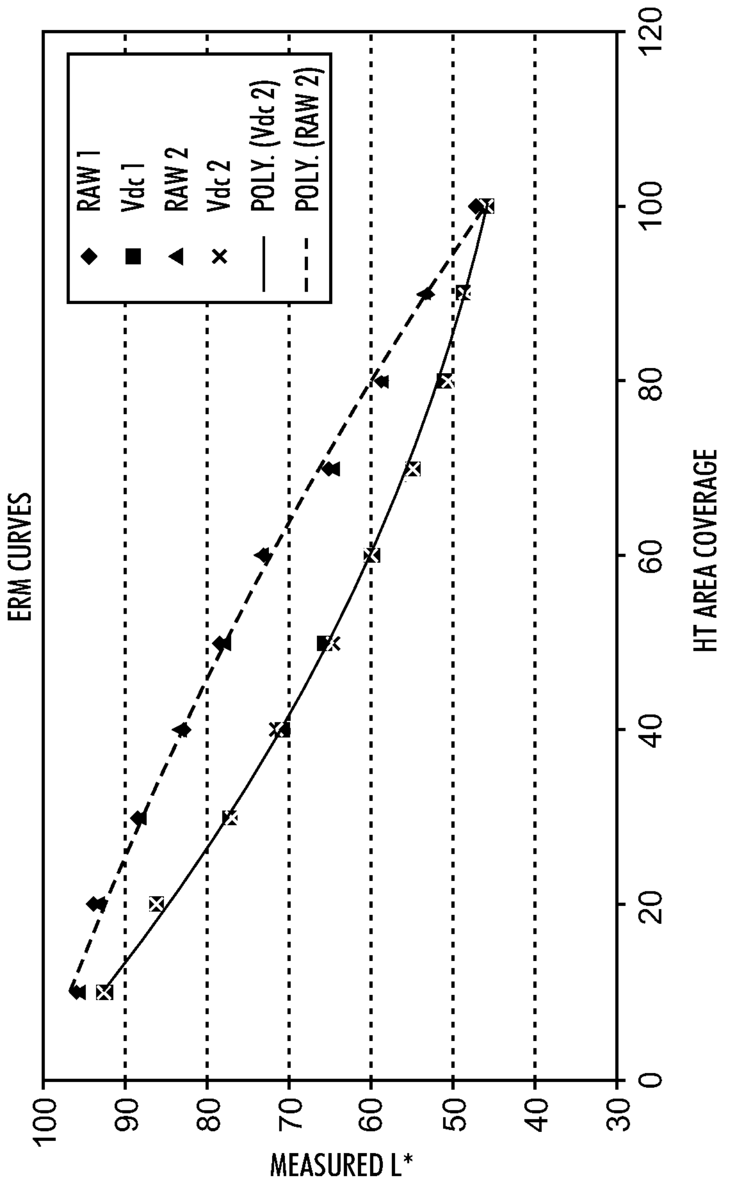
FIG. 9 illustrates the effect of xerographic actuators on the ERM at different xerographic actuator settings, in accordance with an embodiment of the present disclosure.

Therefore, a halftone compensation calculation subsystem 506 of the present disclosure uses an ERM 508 (also shown in FIG. 9) to calculate the required spatial TRC adjustments required to smooth out the entire cross-process non-uniformity. As clearly shown in FIG. 9, the ERM provides a response of darkness level on the paper (i.e., output L*) to halftone area coverage changes at different xerographic actuator settings. As clearly shown in FIG. 9, the ERM provides two sets of data, the first set of data is taken at nominal settings, and the second set of data is taken at a modified set of actuator settings (e.g., Vdc1 and Vdc2). The ERM 508 illustrates measured luminance in L* units on a vertical y-axis and the halftone area coverage expressed as a percentage on a horizontal x-axis.

Further, a low-pass filter (LPF) may be used on the digital correction to prevent ringing in the halftone quantization for uniform gray regions. Low pass filtering is a well known technique by practitioners of the art.

Figure 10:
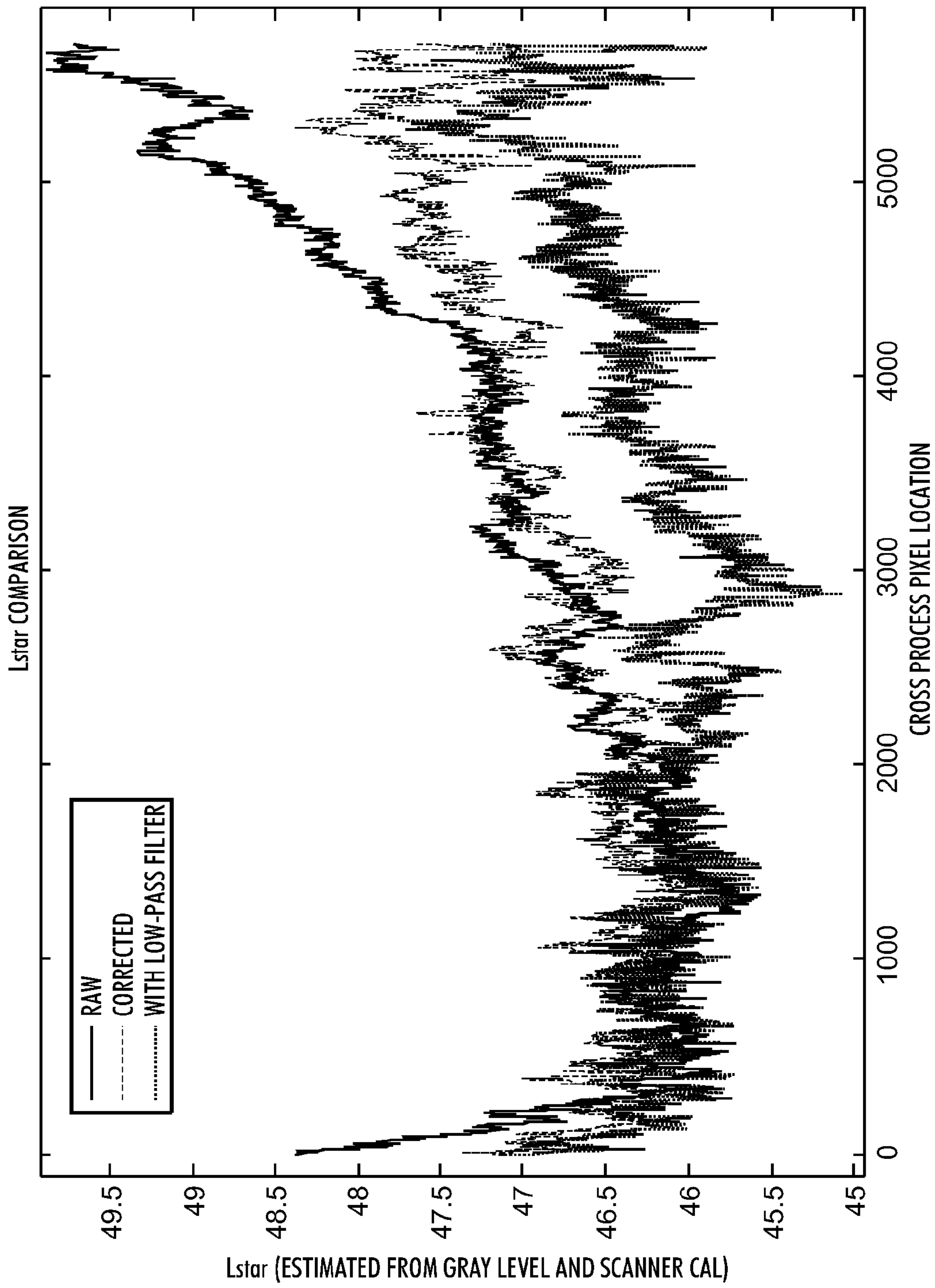
FIG. 10 is a graph illustrating a comparison of the non-uniformities in the solid regions in the cross-process direction in accordance with an embodiment of the present disclosure.

The results of the exemplary system 500 show that the non-uniformity in the solid regions is reduced from a peak-to-peak level of 4 L* units to less than 2 L* units. Further by using, for example, the streak correction techniques, described in U.S. Patent Ser. No. 61/056,754 filed on May 28, 2008, the entirety of which is hereby incorporated herein, the non-uniformity in the solid regions in the 1 L* range may be achieved. The results of the exemplary system 500 are shown in FIG. 10. The graph shown in FIG. 10 illustrates measured luminance in L* units on a vertical y-axis and the cross-process pixel location on a horizontal x-axis.

The three luminance profiles shown in FIG. 10 represent a raw luminance profile taken under nominal xerographic settings, a corrected profile using the system of the present disclosure, and a corrected profile using the system proposed by the present disclosure in combination with a low-pass filter (LPF) applied to the digital correction values. The L* standard deviation value for the raw profile is 1.0407, for the corrected profile using the system proposed by the present disclosure is 0.5232, and for the corrected profile using both the system proposed by the present disclosure and a low-pass filter (LPF) is 0.3963.

For both of the corrections (i.e., for the corrected profile using both the system proposed by the present disclosure, and for the corrected profile using both the system proposed by the present disclosure and a low-pass filter (LPF)), an average Engine Response Model across the entire page is used to adjust the digital image using a Spatially Varying TRC to obtain a uniform output solid. With a FWA and more sophisticated processing, it is possible to characterize the Engine Response on a pixel-by-pixel basis. In one embodiment, using the pixel-wise Engine Response Model (as described in detail in U.S. Patent Ser. No. 61/056,754 filed on May 28, 2008, the entirety of which is hereby incorporated herein), a more accurate spatially varying TRC (i.e., a different TRC for different cross-process regions of the print) during the image based control compensation calculation step in this present disclosure may provide further improvement in the resulting image uniformity.

Figure 7:
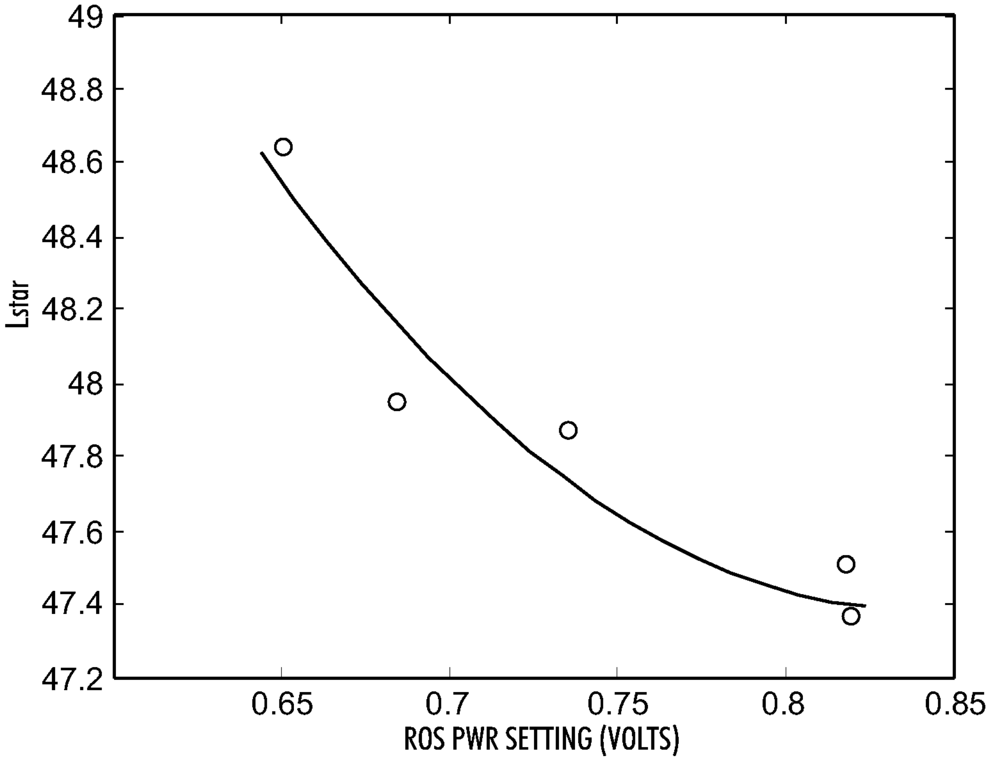
FIG. 7 illustrates a calibration curve for a ROS power actuator that is used as a xerographic actuator in accordance with an embodiment of the present disclosure.

In one embodiment, as shown in FIG. 7, a ROS actuator calibration curve is used as a xerographic or control actuator to adjust the entire image darker. As clearly shown in FIG. 7, the ROS actuator calibration curve provides a response of darkness level on the paper (i.e., output L*) to ROS power actuator. The ROS power calibration curve illustrates reflectivity in L* units on a vertical y-axis and the ROS power setting, expressed in volts, on a horizontal x-axis.

As noted above, the present disclosure, thus, describes a method that enables mitigation of streaks in halftones and solid regions, at all relevant spatial frequencies, using coordinated xerographic and image based control methods. By modifying xerographic actuators slightly to adjust the darkness/lightness of the entire image, and then adjusting the image on a pixel-by-pixel basis, dark or light streaks may be eliminated to prevent unscheduled maintenance or service intervention. Also, the present disclosure provides a method for extending the life of the hardware in the image printing system by maintaining the uniformity throughout the entire image at all area coverage levels using image based control to modify the digital image.

The word “image printing system” as used herein encompasses any device, such as a copier, bookmaking machine, facsimile machine, or a multi-function machine. In addition, the word “image printing system” may include ink jet, laser or other pure printers, which performs a print outputting function for any purpose.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the at to which the present disclosure pertains, and as may be applied to the essential features hereinbefore set forth and followed in the spirit and scope of the appended claims.

What is claimed is:

1. A method for minimizing cross-process direction non-uniformities in solid and heavy shadow regions of printed documents, the method comprising:

marking with a marking engine an image on an image bearing surface moving in a process direction;

generating profile data of the image by sensing an optical characteristic of the image in a cross-process direction;

adjusting at least one control actuator of the marking engine so as to shift the characteristic of a subsequent marked image in the cross-process direction to at least a target value, wherein the target value is a reflectance value for the darkest region in the cross-process direction of the image;

generating a spatially varying tone reproduction curve to smooth the characteristic of the subsequent marked image towards the target value; and adjusting continuous tone values of the subsequent marked image on a pixel-by-pixel basis using the spatially varying tone reproduction curve so as to minimize the cross-process direction non-uniformities in the solid and heavy shadow regions of the printed documents.

2. The method of claim 1, wherein the image marked with the marking engine on the image bearing surface is a toner image.

3. The method of claim 1, wherein the target value is a pre-determined value.

4. The method of claim 1, wherein the target value is determined from the profile data.

5. The method of claim 1, wherein the at least one control actuator of the marking engine is selected from the group consisting of a development field and a cleaning field.

6. The method of claim 1, wherein the characteristic of the image in the cross-process direction is sensed using an array sensor, and wherein the array sensor extends in the cross-process direction and is adjacent the image bearing surface.

7. The method of claim 6, wherein the array sensor comprises a full width array (FWA) sensor.

8. The method of claim 1, wherein the image bearing surface is selected from the group consisting of a photoreceptor drum, a photoreceptor belt, an intermediate transfer belt, and an intermediate transfer drum.

9. The method of claim 1, wherein the adjusting the at least one control actuator of the marking engine comprises an iterative procedure.

10. The method of claim 1, wherein the generation of the spatially varying tone reproduction curve comprises an iterative procedure.

11. The method of claim 5, wherein the development field actuator is selected from a group consisting of exposure intensity and developer bias.

12. The method of claim 5, wherein the cleaning field actuator is selected from a group consisting of a developer bias and a DC voltage applied to a charging device.

13. The method of claim 1, wherein the sensed optical characteristic is one of light reflected from the image bearing surface or light transmitted through the image bearing surface.

14. The method of claim 1, wherein the spatially varying TRC is generated by using a nominal Engine Response Model (ERM) curve.

15. A system for minimizing cross-process non-uniformities in solid and heavy shadow regions of printed documents, the system comprising:

a marking engine configured to mark an image on an image bearing surface moving in a process direction;

a processor configured to generate profile data of the image by sensing an optical characteristic of the image in a cross-process direction; and a controller configured to adjust at least one control actuator of the marking engine so as to shift the characteristic of a subsequent marked image in the cross-process direction to at least a target value, wherein the target value is a reflectance value for the darkest region in the cross-process direction of the image;

wherein the processor is further configured to generate a spatially varying tone reproduction curve to smooth the characteristic of the subsequent marked image towards the target value; and wherein the controller is further configured to adjust continuous tone values of the subsequent marked image on a pixel-by-pixel basis using the spatially varying tone reproduction curve so as to minimize the cross-process direction non-uniformities in the solid and heavy shadow regions of the printed documents.

16. The system of claim 15, wherein the image marked with the marking engine on the image bearing surface is a toner image.

17. The system of claim 15, wherein the target value is a pre-determined characteristic value.

18. The system of claim 15, wherein the target value is determined from the profile data.

19. The system of claim 15, wherein the at least one control actuator of the marking engine is selected from the group consisting of development field and cleaning field.

20. The system of claim 19, wherein the at least one control actuator of the marking engine is adjusted using one or more of the following parameters: an exposure intensity, DC voltage applied to a charge device, or a developer bias.

21. The system of claim 15, wherein the characteristic of the image in the cross-process direction is sensed using an array sensor, and wherein the array sensor is extending in the cross-process direction and is adjacent the image bearing surface.

22. The system of claim 21, wherein the array sensor is a full width array (FWA) sensor.

23. The system of claim 15, wherein the image bearing surface is selected from the group consisting of a photoreceptor drum, a photoreceptor belt, an intermediate transfer belt, and an intermediate transfer drum.

24. The system of claim 15, wherein the sensed optical characteristic is one of light reflected from the image bearing surface or light transmitted through the image bearing surface.

25. The system of claim 16, wherein the spatially varying TRC is generated by using a nominal Engine Response Model (ERM) curve.

* * * * *